(12) United States Patent
Arnold

(10) Patent No.: US 6,418,722 B1
(45) Date of Patent: Jul. 16, 2002

(54) TURBOCHARGER BEARING SYSTEM

(75) Inventor: Steven Don Arnold, Rancho Palos Verdes, CA (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 09/838,721

(22) Filed: Apr. 19, 2001

(51) Int. Cl.[7] ................................................ F02B 33/44
(52) U.S. Cl. ...................................... 60/605.1; 417/407
(58) Field of Search .............................. 60/597, 605.1, 60/605.2; 417/407

(56) References Cited

U.S. PATENT DOCUMENTS 4,157,834 A * 6/1979 Burdette ....................... 277/13
4,322,949 A * 4/1982 Byrne et al. .................. 60/606
4,420,160 A * 12/1983 Laham ......................... 277/40
4,664,605 A * 5/1987 Asano et al. ................ 417/407
4,969,805 A * 11/1990 Romeo ....................... 417/360

* cited by examiner

Primary Examiner—Hoang Nguyen
(74) Attorney, Agent, or Firm—Ephram Starr; Felix Fischer

(57) ABSTRACT

An enhanced bearing system for turbochargers incorporates a thrust collar centrally mounted on the rotating shaft interconnecting the turbine and compressor and a thrust bearing centrally located within the center housing to constrain the thrust collar. Central placement of the thrust collar allows journal bearings and journal seals to be placed immediately adjacent the turbine and compressor wheel attachment points on the shaft enhancing the shaft motion characteristics and sealing capability.

4 Claims, 1 Drawing Sheet

TURBOCHARGER BEARING SYSTEM

FIELD OF THE INVENTION

This invention relates generally to the field of turbochargers and, more particularly, to a turbocharger bearing system comprising a turbocharger shaft thrust collar positioned within a turbocharger center housing to provide a smaller overall turbocharger package, and an overall better stabilized turbocharger shaft operation.

BACKGROUND OF THE INVENTION

Turbochargers for gasoline and diesel internal combustion engines are devices known in the art that are used for pressurizing or boosting the intake air stream, routed to a combustion chamber of the engine, by using the heat and volumetric flow of exhaust gas exiting the engine. Specifically, the exhaust gas exiting the engine is routed into a turbine housing of a turbocharger in a manner that causes an exhaust gas-driven turbine to spin within the housing. The exhaust gas-driven turbine is mounted onto one end of a shaft that is common to a radial air compressor mounted onto an opposite end of the shaft. Thus, rotary action of the turbine also causes the air compressor to spin within a compressor housing of the turbocharger that is separate from the exhaust housing. The spinning action of the air compressor causes intake air to enter the compressor housing and be pressurized or boosted a desired amount before it is mixed with fuel and combusted within the engine combustion chamber.

The common shaft extending between the turbine and compressor is disposed through a turbocharger center housing that includes a bearing assembly for: (1) facilitating shaft rotating action; (2) controlling axially directed shaft thrust effects and radially directed shaft vibrations; (3) providing necessary lubrication to the rotating shaft to minimize friction effects and related wear; and (4) providing a seal between the lubricated assembly and the turbine and compressor housings. The common shaft as used in turbocharger applications is known to have shaft-rotating speeds on the order of 120,000 to 250,000 rpm or higher. Under such operating conditions it is imperative that the bearing assembly provide shaft axial and radial stabilization to maximize shaft balance, thereby maximizing turbocharger housing sealability and compressor/turbine wheel stability.

Various prior art turbocharger housing bearing assemblies include a first annular seal at a housing turbine-side axial end, a second journal bearing adjacent the first annular seal, a second journal bearing, a generally dead space between the first and second journal bearings, a thrust collar at a housing compressor-side axial end, and a second annular seal disposed adjacent the thrust collar. Configured in this manner, a conventional turbocharger housing is axially lengthy, the journal bearing are spaced relatively close together, and a relatively long moment arm or cantilever exists between the second journal bearing and the compressor wheel.

It is, therefore, desired that a turbocharger bearing system be constructed that provides a more compact turbocharger package and better shaft stabilization and balance when compared to conventional bearing assemblies. It is further desired that the bearing system be constructed to improve these properties without adversely impacting the lubricating and thrust load handling capabilities of the bearing system.

SUMMARY OF THE INVENTION

Turbocharger bearing systems, constructed according to principles of this invention incorporate (1) a pair of journal bearings disposed adjacent respective compressor and turbine ends of the center housing; (2) a pair of journal seals positioned at adjacent respective compressor and turbine ends of the center housing next to respective journal bearings; and (3) a thrust collar disposed within the center housing and interposed between the journal bearings, wherein the thrust collar is positioned at an approximate axial center of the housing and cooperates with a central housing flange to control axial shaft movement. Configured in this manner, bearing systems of this invention improve shaft stability and balance, reduce turbocharger package size, and improve center housing sealability.

BRIEF DESCRIPTION OF THE DRAWINGS

The invention will be better understood with reference to the following drawings and detailed description in which.

DETAILED DESCRIPTION OF THE INVENTION

Figure 1:
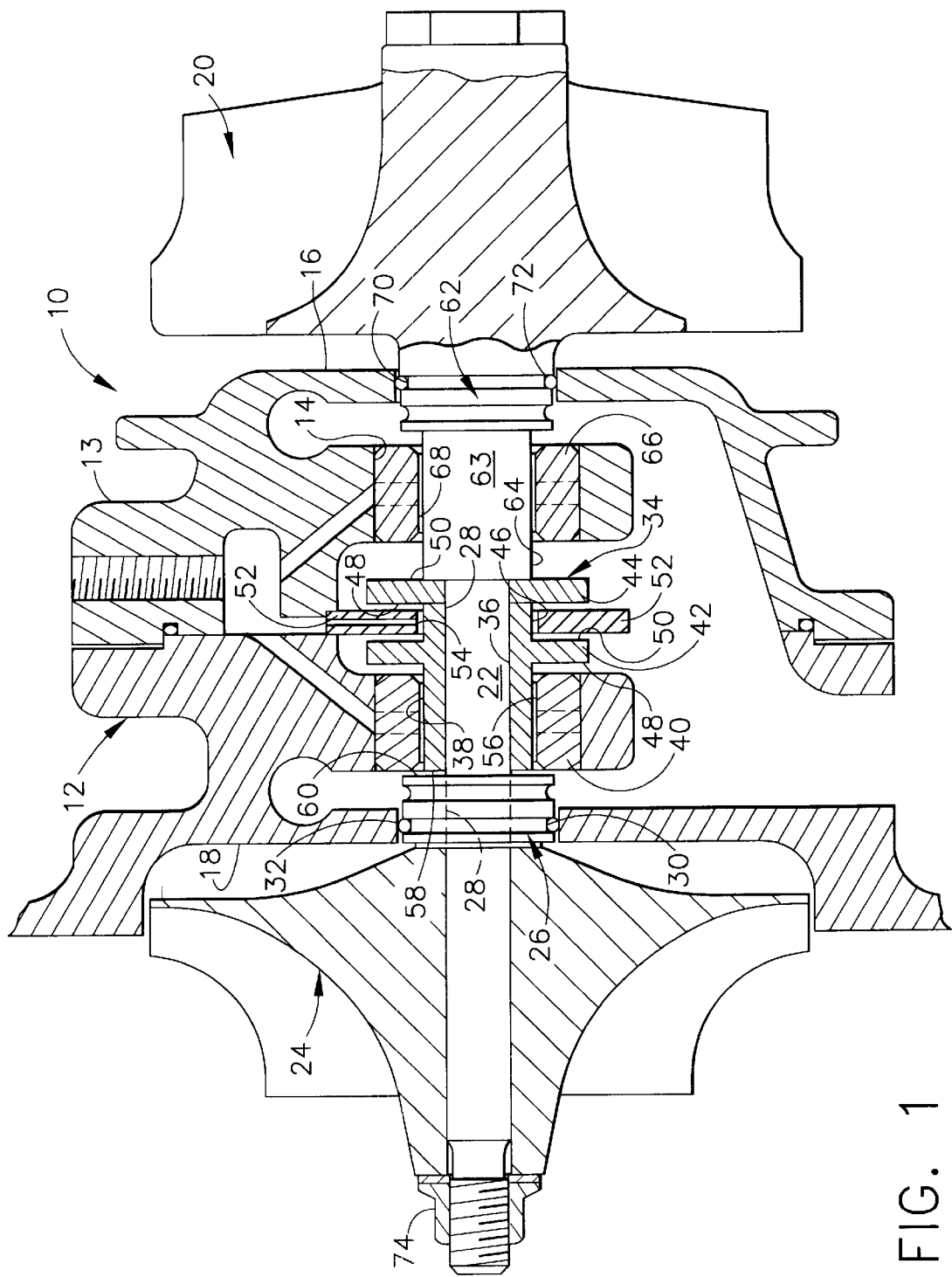
FIG. 1 is an elevation section view of a turbochager center housing and rotating assembly incorporating the present invention.

A bearing system 10 of this invention is illustrated FIG. 1. Generally, the bearing system is disposed within a turbocharger having an extended compressor housing backplate 12 and a center housing 13 having a central opening 14 extending axially therethrough from a turbine end 16 to a compressor end 18. The extended backplate attaches to the center housing at an approximate midpoint of the turbocharger and the rotating group which includes a turbine 20 is attached to one end of a shaft 22 that projects from end 16 of the housing. A compressor wheel 24 is attached to the opposite end of the shaft 22 that projects from end 18 of the housing.

Moving from left to right across the figure, the bearing system of this invention incorporates a first annular seal 26 that is disposed within the housing opening 14 at end 18. The first annular seal has a central shaft opening 28 that is sized to accommodate placement of the shaft 22 therein, and includes a groove 30 disposed circumferentially around an outside diameter surface that is sized and shaped to accommodate placement of a seal ring 32 therein. The seal ring 32 provides a leak-tight seal between the first annular seal 26 and the central opening 14. The first annular seal extends axially a distance within the housing and makes abutting contact with a thrust collar 34.

The thrust collar 34 comprises a central shaft opening 36 to accommodate placement of the shaft 22 therein, and includes a first diameter section 38 that extends a distance axially away from the first annular seal. As better described below, the first diameter section 38 is sized having an outside diameter that fits within a first journal bearing 40. The thrust collar 34 includes first and second extended diameter sections 42 and 44 that are spaced apart from one another, and that each extend radially outwardly a distance away from the first diameter section 38. The extended diameter sections 42 and 44 are separated by a reduced diameter section 46 that, in a preferred embodiment, has a diameter that is approximately that of the first diameter section 38. Each extended diameter section includes frontside and backside axially-facing surfaces 48 and 50.

The thrust collar 34 is restrained axially within the housing 12 by placement of the extended diameter sections 42 and 44 on either side of a thrust bearing 52 that is supported in the housing and extends radially inwardly towards the thrust collar. Specifically, the thrust bearing 52 is horse-shoe shaped in the embodiment shown and has an inside diameter 54 that is less than that of each extended diameter section outside diameter, but that is slightly greater than that of the thrust collar reduced diameter section 46 to trap the thrust collar axially within the housing. To provide fluid for the hydrodynamic bearing, the thrust bearing 52 can include an oil passage disposed radially therethrough to facilitate lubricating the bearing and collar.

In alternative embodiments, the thrust collar extended diameter sections and reduced diameter section are divided into two or three separate elements to accommodate a 360 degree thrust bearing.

A first journal bearing 40 is disposed axially within the housing central opening 14 between the first annular seal 26 and the thrust collar 34. The bearing 40 is annular, having an inside diameter 56 that is sized to accommodate placement of the thrust collar first diameter section 38 therein. The thrust collar first diameter section 56, thus extends axially completely through the first journal bearing 40 such that a thrust collar axial end 58 make abutting contact against an adjacent first annular seal axial surface 60. The first journal bearing 40 includes at least one oil passage disposed radially therethrough for facilitating oil passage to and from the journal bearing.

Moving axially past the thrust collar 34, the shaft 22 includes an enlarged diameter section 63 that extends axially from the thrust collar extended diameter section 44 backside axial surface 50 to a second annular seal 62. The enlarged diameter section 63 make abutting contact against the thrust collar and has an outside diameter 64 that is sized to fit within a second annular journal bearing 66 that is disposed within the housing central opening 14. Specifically, the shaft enlarged diameter section is sized to fit within an inside diameter 68 of the second annular journal bearing 66. The second annular journal bearing 66 includes one or more oil passage disposed radially therethrough to facilitate the passage of oil to and from the floating journal bearing.

A second annular journal seal 62 is disposed within the housing central opening 14, and comprises a groove 70 disposed circumferentially therearound, and a seal ring 72 disposed therein to provide a leak-tight seal with the housing.

A key feature of turbocharger bearing systems of this invention is the design of the thrust collar that permits its placement within the middle of the turbocharger center housing, rather than at the housing compressor side. Placement of the thrust collar within the center of the housing is desirable because is reduces the overall axial length of the housing, when compared to a conventional housing built to accommodate a compressor-side located thrust collar. Additionally, placement of the thrust collar in the center of the housing permits the journal bearings to be spaced apart along the shaft a greater distance that was previously possible. The wider journal bearing spacing within the housing is desired because it acts to provide better shaft stabilization and balance, thereby improving journal bearing and journal seal life. Further, relocating placement of the thrust collar from the housing compressor end, and the end of the bearing system, reduces the amount of cantilever or overhang of the compressor wheel. Reducing this overhang further improves shaft balance, shaft sealing, and rotor stability. The configuration preserves the ability to assemble the turbocharger rotating group including the compressor wheel, shaft, annular seals, journal bearings, thrust collar and turbine wheel as a single unit with lockup provided through a threaded end nut 74 on the compressor wheel nose or a threaded hub on a compressor wheel without a through bore.

Having now described the invention in detail as required by the patent statutes, those skilled in the art will recognize modifications and substitutions to the specific embodiments disclosed herein. Such modifications are within the scope and intent of the present invention as described in the following claims:

What is claimed is:

1. A thrust collar for use within a turbocharger having an elongated compressor backplate and a center housing comprising:

an elongated first diameter section having a central turbine shaft opening disposed axially therethrough from a first axial end;

a first extended diameter section extending radially outwardly a distance from the first diameter section, the first extended diameter section having axially-facing front and backside surfaces;

a second extended diameter section extending radially outwardly a distance from the first diameter section and disposed axially adjacent the first extended diameter section, the second extended diameter section having axially-facing front and backside surfaces, the second extended diameter section backside surface defining a bearing second axial end; and a second diameter section interposed between the first and second extended diameter sections;

wherein, the first diameter section is received within a journal bearing and the first and second extended diameter sections engage a thrust bearing centrally mounted intermediate the elongated backplate and the center housing.

2. A turbocharger bearing system disposed within a turbocharger having an elongated compressor backplate and a center housing comprising:

first and second annular journal seals disposed within a turbocharger center housing central opening at opposite housing axial ends;

first and second annular journal bearings disposed within the housing axially inwardly of respective first and second annular journal seals;

a thrust collar disposed near an axial center point of the housing and interposed between the first and second annular journal bearings, the thrust collar including:

an elongated first diameter section that is disposed concentrically within the first journal bearing;

a first extended diameter section that extends radially away from the first diameter section;

a second extended diameter section disposed axially adjacent the first extended diameter section, and that extends radially from the first diameter section;

a second diameter section interposed between the first and second extended diameter sections and that has a diameter similar to that of the first diameter section; and a thrust bearing centrally mounted intermediate the elongated backplate and the center housing and received between the first and second extended diameter sections.

3. A turbocharger for an internal combustion engine having a turbine housing, a compressor housing having an elongated compressor backplate attached thereto, a center housing interposed between the turbine and compressor housing and an improved bearing comprising:

a shaft extending through the center housing and attached to a turbine wheel at one end extending into the turbine housing, and said shaft received into a compressor wheel bore at an opposite shaft end extending into the compressor housing;

a bearing system disposed within the elongated backplate and center housing having first and second annular journal seals disposed within a central opening in the extended backplate and center housing at opposite axial ends of the shaft;

first and second annular journal bearings disposed within the center housing axially inwardly of respective first and second annular journal seals;

a thrust collar disposed near an axial center point of the housing and interposed between the first and second annular journal bearings, the thrust collar including:
 an elongated first diameter section that is disposed concentrically within the first journal bearing;
 a first extended diameter section that extends radially away from the first diameter section;
 a second extended diameter section disposed axially adjacent the first extended diameter section, and that extends radially from the first diameter section;
 a second diameter section interposed between the first and second extended diameter sections and that has a diameter similar to that of the first diameter section;

a thrust bearing centrally mounted intermediate the elongated back plate and the center housing engaged intermediate the thrust collar first and second extended diameter sections to axially fix the thrust collar within the housing; and means for securing the compressor wheel to the shaft for lockup of the compressor wheel, first and second journal seals, first and second journal bearings and thrust collar.

4. A turbocharger bearing system disposed within a turbocharger having an elongated compressor backplate and a center housing comprising:

first and second annular journal seals disposed within the turbocharger, wherein the first annular journal seal is disposed within a central opening in the elongated compressor backplate adjacent a compressor wheel, and wherein the second annular journal seal is disposed within a central opening in the center housing;

first and second annular journal bearings disposed within respective elongated compressor backplate and center housing central openings axially inwardly of respective first and second annular journal seals;

a thrust collar disposed intermediate the elongated compressor backplate and the center housing, and interposed between the first and second annular journal bearings, the thrust collar including:
 an elongated first diameter section that is disposed concentrically within the first journal bearing;
 a first extended diameter section that extends radially away from the first diameter section;
 a second extended diameter section disposed axially adjacent the first extended diameter section, and that extends radially from the first diameter section;
 a second diameter section interposed between the first and second extended diameter sections and that has a diameter similar to that of the first diameter section; and a thrust bearing centrally mounted intermediate the elongated compressor backplate and the center housing and received between the first and second extended diameter sections.

* * * * *